United States Patent [19]

Maass et al.

[11] Patent Number: 4,867,617
[45] Date of Patent: Sep. 19, 1989

[54] AIR LOGIC CIRCUIT FOR AIRFEED PECK DRILL

[75] Inventors: James A. Maass; John F. Stewart; Joseph F. Carter, all of Lexington, S.C.

[73] Assignee: Cooper Industries, Inc., Houston, Tex.

[21] Appl. No.: 114,956

[22] Filed: Oct. 30, 1987

[51] Int. Cl.⁴ .......................................... B23B 27/22
[52] U.S. Cl. ..................................................... 408/17
[58] Field of Search ........................................ 408/17

[56] References Cited

U.S. PATENT DOCUMENTS 4,123,188 10/1978 Deremo et al. .......................... 408/17

Primary Examiner—Bruce Y. Arnold
Assistant Examiner—J. P. Ryan
Attorney, Agent, or Firm—Alan R. Thiele; Eddie F. Scott

[57] ABSTRACT

An improvement to an air logic circuit for an airfeed peck drill includes the insertion of a retract valve between the command valve and the air motor. This retract valve generates a required signal to only allow the drill quill to feed forward after it has been fully retracted 1 Claim, 1 Drawing Sheet

AIR LOGIC CIRCUIT FOR AIRFEED PECK DRILL

BACKGROUND OF THE INVENTION

The present invention relates to airfeed tools, more particularly the present invention relates to air logic circuits for airfeed tools.

The use of peck drilling in heavy industry, particularly industry which requires the drilling of a plurality of holes in a variety of metal pieces, has shown a dramatic increase in recent years. This is because the holes resulting from a peck drilling operation exhibit greater accuracy then holes drilled by conventional drilling operations. Additionally, the surface finish of the hole is much smoother than obtained with conventional drills.

U.S. Pat. No. 4,123,188 to Deremo et al. and U.S. Pat. No. 4,421,441 to Hirose are representative of the design of airfeed peck drills. Such prior art airfeed peck drills include a motor and reduction gearing which is contained within a cylinder to form a drill quill which is attached to the end of an air cylinder. The air cylinder in these prior art drills is used to advance and retract the drill quill into an out of a workpiece. In order to prevent the drill quill from feeding forward before being fully retracted, the back pressure created by the returning quill is used as a signal.

On newer airfeed drills, different sized areas are used on the feed-retract piston. The air logic circuitry as taught in U.S. Pat. No. 4,123,188 will not provide the necessary signal to prevent the tool from feeding forward until fully retracted.

There is therefore a need in the art to provide an air logic circuit which will prevent airfeed peck drills having different sized areas on either side of a feed retract piston from feeding forward until fully retracted.

SUMMARY OF THE INVENTION

An improvement in an air logic circuit for an airfeed peck having different sized areas on either side of a feed-retract piston prevents forward feed until the quill is fully retracted by incorporating a retract valve between the command valve and the air motor of the airfeed peck drill. This retract valve is used to sense the full retraction of the quill and then generate a signal when the quill has been fully retracted.

BRIEF DESCRIPTION OF THE DRAWINGS

A better understanding of the improvement to the air logic circuit of an airfeed peck drill of the present invention may be had by reference to the drawings wherein.

DESCRIPTION OF THE EMBODIMENTS

Figure 1:
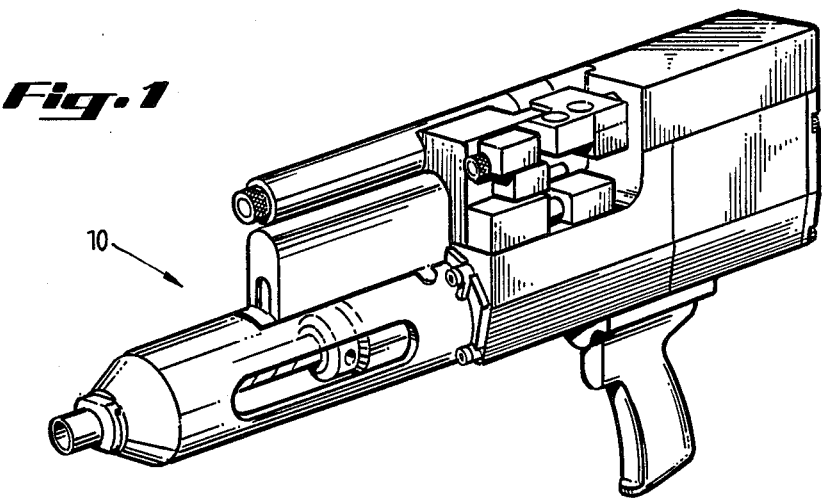
FIG. 1 is a perspective view of an airfeed peck drill.

An airfeed peck drill 10 of the type incorporating the air logic circuit of the present invention is shown in FIG. 1. Such tools are characterized by operating in a pecking fashion. This peck type drilling includes the insertion, extraction and reinsertion of a rotating drill bit into a hole. It has been found that this manner of drilling a hole provide extremely accurate holes with a very smooth internal surface finishes. These results are accomplished because the flutes of the drill are purged of metal shavings or chips each time the drill is pecked out of the hole and the drill tip is allowed to cool when it is not in contact with the bottom of the hole being drilled.

Figure 2:
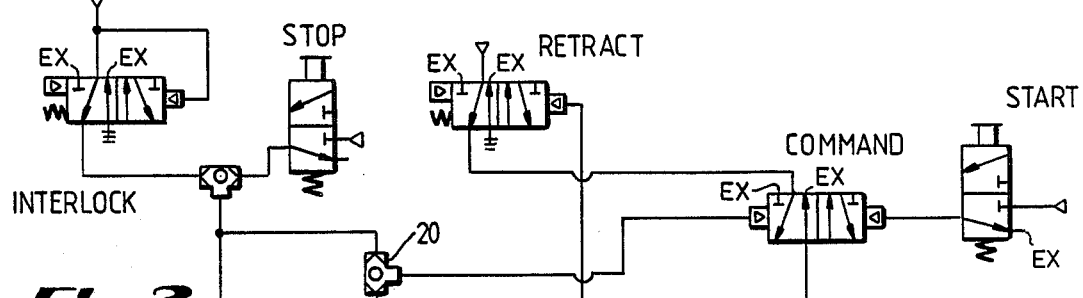
FIG. 2 is a schematic diagram of the air logic circuit for an airfeed peck drill.
Figure 2:
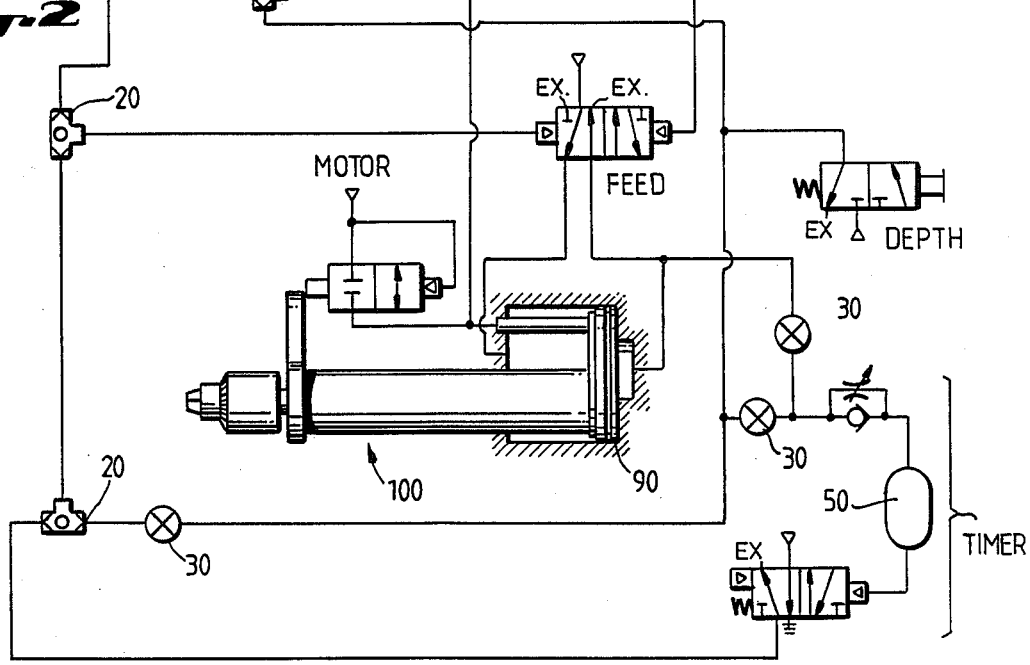

Air logic circuits are used to control the insertion, extraction and reinsertion of the rotating drill quill 100 into the hole being drilled. In FIG. 2 a schematic diagram of the air logic circuit for an airfeed peck drill is shown. In this diagram, the tool is shown in the retracted position and the main air supply has been disconnected from the tool 10. All valves are shown in their reset position. Each valve is designated by the name which appears in close proximity to the valve. The small triangles represent the main air supply. The letters EX stand for exhaust. Additionally, the circuit includes shutter valves, 20, on-off valves 30, a flow control 40 and an accumulator 50.

Operation of the tool begins with applying air to the tool which activates the INTERLOCK valve. This sends a puff of air to the COMMAND and FEED valves resetting them if necessary. The INTERLOCK valve remains in a set position while air is supplied to the tool. This set position is done to ensure that the tool is retracted regardless of what state the tool was in prior to the last removal of the supply of air from the tool.

Depressing the START BUTTON sets the COMMAND valve which allows air to flow through the RETRACT valve to shuttle the FEED valve. The tool is then allowed to feed forward and the motor begins to run. Air through the MOTOR valve sets and maintains the RETRACT valve.

The drill mode chosen determines what happens next. The mode is selected by the configuration array of the on-off valves. In the conventional mode of operation, the tool will continue to feed forward until either the DEPTH valve or STOP valve is depressed. The signal from either the DEPTH valve or the STOP valve shuttles both the COMMAND valve and FEED valve to their reset positions. When in these reset positions the tool is caused to retract and shut off.

In the dwell mode of operation the tool will feed forward, and if not interrupted by the STOP valve, it will hit the DEPTH valve. When it hits the depth valve, air will be diverted to the TIMER valve. After a predetermined amount of time has elapsed, the TIMER valve will fire and reset the FEED valve and COMMAND valve to send the quill back to the beginning of its stroke and turn the motor off.

The peck mode of operation is identical to the dwell operation except for two key points. First, the TIMER valve is fed with quill feed air. And secondly when the TIMER valve reaches a preset time, only the FEED valve is shuttled and not the COMMAND valve. This means that when the tool is retracted, the MOTOR valve shuts off removing it signal from the RETRACT valve. Air is then fed from the RETRACT valve through the set COMMAND valve and shuttles the FEED valve to its feed position. The feed and retract action continues until the tool hits the DEPTH valve or the STOP valve which sends the quill back to the beginning of its stroke and turns the motor off.

The addition of a RETRACT valve between the COMMAND valve and the motor in drill quill 100 allows the circuitry taught in U.S. Pat. No. 4,123,188 to be applied to airfeed peck drills wherein the feed and retract piston 90 is characterized by having different areas on either side. Without the RETRACT valve, the tool will not feed forward until fully retracted. Accordingly, when motor supply air is not sensed by the retract valve, the quill will be in its fully retracted condition.

The foregoing embodiment is intended to illustrate the present invention and not to limit it in spirit or scope.

It is claimed that:

1. An air logic circuit for controlling the movement of an airfeed peck drill having different sized areas on either side of a feed-retract piston and including a command valve and an air motor, said air motor being contained within a quill, said circuit comprising:

a coupling between the command valve and a source of pressurized air;

a retract valve coupled to said command valve and in a series connection between said command valve and the air motor;

said retract valve constructed and arranged to sense air motor supply air pressure, and generate a signal when no air pressure is being supplied to the air motor;

whereby the tool will move to its retracted state regardless of the state of the tool prior to the last removal of supply air from the tool.

* * * * *